May 22, 1934.   L. PLANSKOY   1,959,498
PRODUCTION OF COMPOSITE MOTION PICTURES
Filed April 22, 1931   2 Sheets-Sheet 2

INVENTOR
Leonti Planskoy,
By
Watson, Coit, Morse & Grindle
Attys

Patented May 22, 1934

1,959,498

UNITED STATES PATENT OFFICE 1,959,498

PRODUCTION OF COMPOSITE MOTION PICTURES

Leonti Planskoy, Paris, France, assignor to Societe A. R. L. Metra, Paris, France Application April 22, 1931, Serial No. 532,069
In Great Britain July 10, 1930

4 Claims. (Cl. 88—16)

This invention relates to the production of composite motion pictures by combining two or more motion picture films.

Hitherto composite motion pictures have been produced in various ways, for instance by feeding together through a projector two films arranged with their emulsion-treated faces in contact, one of said films being an unexposed film and the other carrying a series of black silhouettes constituting masks of a series of pictures of a foreground object, and by projecting onto said unexposed film and film carrying the silhouettes a series of images of the foreground object and a background respectively.

All the known processes, however, suffer from the disadvantage that in the event of an object on one of the films being displaced relatively to objects on any of the other films, the desired illusion cannot be obtained in the composite picture because heretofore it has not been possible to adjust all the films independently of one another.

This disadvantage is overcome by the present invention which provides apparatus for the production of composite motion pictures from a number of separate films whereof one film at least serves as a mask, comprising the combination of separate projector heads, one for each of said films, means for adjusting each of said films independently of one another in at least directions extending longitudinally and laterally of the film, and means for optically projecting simultaneously the images on all of said films in proper correlation onto an image-receiving surface.

It is within the invention to project the image of the background with a portion masked corresponding to the foreground object from one or more films. Thus there is no necessity to produce a single intermediate film having an unexposed portion conforming to the outline of the foreground object, but such a film can be produced and used if desired.

The terms "background" and "foreground object" are used herein to denote any objects or scenes which it is desired to reproduce, and the term "films" is intended to include any light-sensitive bodies suitable for photographic purposes. Moreover, in the method according to the invention any suitable reproductions may be used, that is to say wherever "negatives" are referred to they may be replaced by "positives" and vice versa.

It is also within the invention to project the composite picture formed by combining the various images directly on to any suitable image-receiving surface, for instance either on to a screen for exhibition or to produce a composite film for reproduction purposes or subsequent exhibition.

When one of the projectors with its appropriate optical system is arranged to project light rays at an angle to the rays from another projector and optical system, a semi-transparent reflector is provided for directing the rays from the first-mentioned projector into the path of those from the other projector. These reflectors may take the form of semi-transparent mirrors through which rays from one of the projectors pass directly to the screen. In certain cases, mirrors of other kinds, prisms or coloured filters transmitting and reflecting light of complementary colours may be employed.

The projectors and/or reflectors are mounted in any convenient manner so as to permit them to be adjusted relatively to one another for focussing, registering or other purposes.

One embodiment of the invention wherein two foreground objects are combined with a background will now be described, by way of example, with reference to the accompanying drawings, in which:—

Like reference numerals indicate like parts in both figures.

Figure 1:
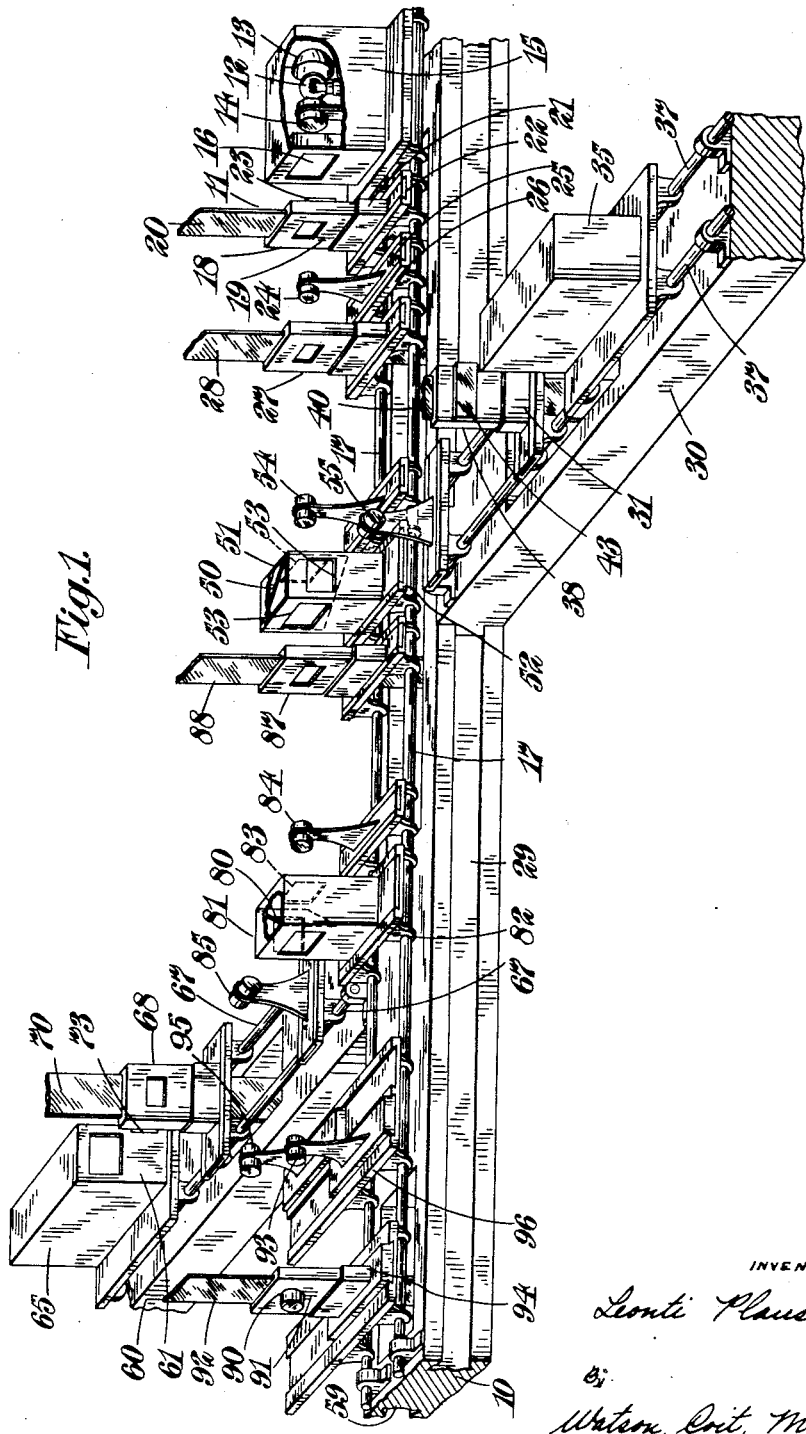
Figure 1 is a perspective diagrammatic view of the apparatus.

The apparatus comprises a main optical bench 10 of any suitable construction. On one end of the bench 10 is mounted a projector which is indicated generally by the reference numeral 11 and comprises an electric lamp 12 constituting the source of light, a reflector 13 arranged behind the lamp and a condensing lens 14 arranged in front of the lamp. The lamp, reflector and condensing lens are arranged in a light-tight casing 15 which has an aperture 16 in its front wall and is mounted on rails 17 on the bench 10 to permit it to be adjusted longitudinally of the bench. The projector 11 also comprises a projector head which is indicated generally by the reference numeral 18 and comprises a gate 19 through which a positive film 20 of the background is fed. The gate 19 is vertically slidable in a guide 21 which is itself slidably mounted transversely of the bench 10 in a carriage 22. This carriage is also adjustably mounted on the rails 17 so that it can be moved towards and away from the light-tight casing 15. Mounted on the gate 19 is a colour-filter 23, and in front of the gate is arranged a so-called one by one magnification lens 24, i. e. a lens specially corrected to give an image equal in size to the object. This lens is carried by a slide 25 which is adjustable transversely of the bench 10 on a carriage 26 mounted for longitudinal movement on the rails 17. In front of the lens 24 is a projector head 27 for an intensified negative film 28, or for a film having a mordanted dye-toned image of one foreground object. The head 27 comprises a gate, a guide and a carriage which are in all respects similar to those of the projector head 18.

At one side of the main bench 10 is an auxiliary optical bench 30 which is mounted in a guideway 29 in the bench 10 so that it can be adjusted longitudinally of the latter. Another projector 31 similar to the projector 11 is mounted on rods 37 so that it can be adjusted longitudinally of the bench 30. The projector 31 comprises a light-tight casing 35 which like the casing 15 contains an electric lamp 12, a reflector 13 and a condensing lens 14. In front of the casing 35 is a projector head 38 for a positive film 40 of the aforesaid foreground object. The projector head 38 also carries a colour filter 43.

Figure 2:
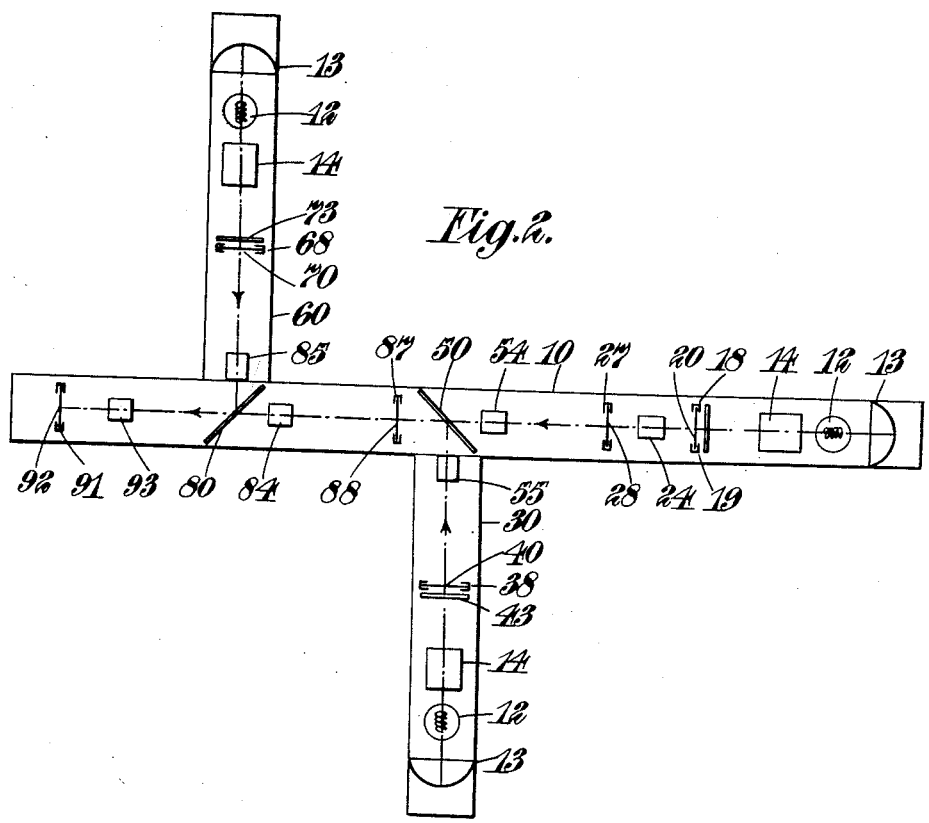
Figure 2 is a diagrammatic plan thereof.

The auxiliary bench 30 is arranged at right angles to the bench 10 so that the beam of light from the projector 31 is approximately normal to the beam from the projector 11 as shown by the arrows in Figure 2. A semi-transparent mirror 50 is mounted on the main bench 10 so as to intercept the beams emanating from the projectors 11 and 31. This mirror is arranged in a casing 51 adjustably mounted transversely of the bench 10 on a carriage 52 which can be adjusted along the rails 17. Apertures 53 are provided in the front, the rear and the side wall facing the projector 31 of the casing 51 for the passage of light rays. Lenses 54, 55 each similar to the lens 24 are arranged between the casing 51 and the projector heads 27, 38 and are each adjustably mounted transversely and longitudinally of their respective benches.

On the opposite side of the bench 10 to that on which the bench 30 is arranged is a second auxiliary optical bench 60. This bench is likewise adjustable along the main bench in a guideway 59. Mounted on rods 67 which extend longitudinally of the bench 60 are a projector 61 comprising a light-tight casing 65 in which are arranged an electric lamp 12, a reflector 13 and a condensing lens 14, and a projector head 68 for a positive film 70 of the other foreground object. Mounted on the projector head 68 is a colour filter 73. Adjustably mounted on the main bench 10 so as to intercept the beams leaving the casing 51 and the projector 61 is a second semi-transparent mirror 80. This mirror 80 is arranged in a casing 81 on a carriage 82 so that it can be adjusted in the manner described with reference to the mirror 50. Apertures 83 are provided in the casing 81 in the front, the rear and the side wall facing the projector head 68. Between the casings 81 and 51 there is adjustably mounted on the main bench 10 near to the casing 81 a lens 84 similar to the lens 24 and a similar lens 85 is mounted on the bench 60 between the projector head 68 and the casing 81. Near to the casing 51 and between it and the lens 84 is a projector head 87 for an intensified negative film 88, or for a film having a mordanted dye-toned image, of the said other foreground object. The projector head 87 is constructed and mounted in a similar manner to the projector head 27. If the compound films are not equally "soft", the necessary adjustment may be effected by replacing one or more of the lenses 54, 55, 84 or 85 by a "soft focus" lens of similar focal length and aperture.

On the opposite end of the main optical bench 10 to that on which the projector 11 is arranged, is a motion picture camera indicated generally by the reference numeral 90. This camera comprises a gate 91 through which a sensitized film 92 is fed, and a lens 93 whereby the real image of the combined picture is projected into the camera. The gate 91 and the lens 93 are arranged so that they can be independently adjusted longitudinally and transversely of the bench 10. The gate 91 is also vertically adjustable in a guide 94.

For the purpose of checking the real image of the composite picture, a projection lens 95 of different focal length but otherwise similar to the lens 93 is provided. This lens is adjustably mounted on a carriage 96 on which the lens 93 is adjustably mounted. When it is desired to check the said image, the camera 90 is moved clear of the beam of light rays leaving the casing 81, and the lens 95 is brought into position to intercept that beam so that the real image can then be projected on to a movable screen for inspection.

It is to be understood that all the projectors, lenses and mirrors are adjustably mounted on their respective benches in any convenient manner. None of the synchronous motors with which each projector head and the camera are equipped and the mechanisms employed for effecting the aforesaid adjustments is shown on the drawings as they do not constitute any part of the invention. Preferably, the said motors and mechanisms will be arranged so that they can all be controlled from the camera end of the main optical bench by one operator. The light source for each projector is also separately adjustable so that the sensitized film in the camera can be subjected to exposures of different intensities from the component film. The projectors are also provided with means permitting the ratio between the movements of the component films to be adjusted at will.

When using the apparatus described above, a positive film 20 of the background is fed through the projector head 18 and the film 28 which provides a mask of the first foreground object is fed through the projector head 27. A positive film 40 corresponding to the film 28 is fed through the projector head 38. The film 88 which provides a mask of the second foreground object is fed through the projector head 87 and a positive film 70 corresponding thereto is fed through the projector head 68. The necessary adjustments of the various devices mounted on the optical benches are then made to bring the composite image properly into focus and a composite picture is produced on the film 92 in the camera 90. In cases where the background and foreground objects have been taken at different speeds, the projector speeds are adjusted so as to compensate for this difference.

From the foregoing description it will be appreciated that the invention provides apparatus wherein, adjustments to allow for different relative speeds, sizes, photographic gradation and camera angles are facilitated. Photographic gradation can be adjusted since it depends on the intensity of exposure and relative contrast. Both of these factors are adjustable in the apparatus since the light intensities of the component films can be varied and filters for influencing the relative contrast can be arranged in the paths of the light rays. Moreover, as the component films are kept separate, the filters can be arranged in such a way as to influence differently the gradation of different films.

The films required are (a) a positive of the background, and (b) two films of each foreground object taken against a uniform background and absolutely similar in regard to action and framing, but in one of these films the density of the background thereof must be greater than the maximum density of the image thereon, while in the other the density of the background must be less than the minimum density of the image thereon. The films (b) can be made in any suitable manner well-known to those skilled in the art. For instance, by taking a positive and a negative of the foreground object against a uniform white or black background respectively, or by taking two negatives or two positives of the object against a uniform colour background with complementary filters, one of the filters transmitting the light of wave length reflected by the background. The film having the background of lesser density is toned red, for example, by the mordant dye process, in such a way that the image thereon is coloured while the background of the film remains clear, thus forming a mask.

It is to be understood that the invention is not restricted to the precise arrangement described with reference to the drawings. For instance, when only one foreground object is to be combined with the background the projector 61 and its associated parts will not be required, and if more than two foreground objects are to be combined with the background then another auxiliary optical bench, projector and associated parts are provided in any suitable position with respect to the main optical bench. Further, it is to be remembered that the drawings are diagrammatic; the various devices mounted thereon and the means for adjusting and controlling those devices may be of any well-known or convenient kind, and in addition to the adjustments specifically mentioned hereinbefore provision may be made for angularly adjusting in any desired direction any of the devices on the various optical benches.

I claim:—

1. Apparatus for the production of composite motion pictures, comprising a main optical bench, a projector at one end of said bench for a film of the desired background, a motion picture camera arranged at the other end of said bench facing said projector for a sensitized film constituting an image-receiving surface, and a lens system, a projector head for a photographically obtained light filter constituting a mask of a foreground object and a second lens system mounted in succession on said main bench in front of said projector, an auxiliary optical bench at right angles to the main bench, a projector on said auxiliary bench for a film of said foreground object, a lens system in front of the projector on the auxiliary bench, a semi-transparent reflector on the main bench to intercept the beams from the aforesaid projector head and projector and to direct the composite beam formed thereby towards the motion picture camera, a second projector head mounted on the main bench in the path of said composite beam for a photographically obtained light filter constituting a mask of a second foreground object, a lens system on the main bench in front of said second projector head, a second auxiliary optical bench arranged at right angles to the main bench, on the opposite side of the main bench to that on which the first auxiliary bench is situated, a projector on said second auxiliary bench for a film of said second foreground object, a lens system in front of the projector on the second auxiliary bench, and a second semi-transparent reflector on the main bench to intercept the beams from the said second projector head and the projector on the second auxiliary bench and to direct the final composite beam formed thereby on to the sensitized film in the motion picture camera.

2. Apparatus for the production of composite motion pictures as claimed in claim 1, comprising also means whereby the said composite beam can be projected on to a movable screen for the purpose described.

3. In an apparatus for producing composite motion pictures, in combination a first guideway adapted to guide a composite image receiving film, a second guideway facing said first guideway and adapted to guide an image carrying film, a projector adapted to project light in a longitudinal direction towards said first guideway through said second guideway, a semi-transparent reflecting device between said first and second guideways adapted to transmit light travelling towards said first guideway and to reflect towards said first guideway light coming from a transverse direction, in said transverse direction a lateral guideway facing said reflecting device and adapted to guide an image carrying film and a lateral projector adapted to project light towards said reflecting device through said lateral guideway, between said second guideway and said reflecting device an intermediate guideway adapted to guide an image carrying film constituting a mask of the images of the film in the lateral guideway, optical means between said first guideway and said intermediate guideway and between said intermediate guideway and said second guideway so disposed with relation to said guideways that two consecutive guideways are in the planes of conjugate foci of said optical means, optical means in the path of light of said lateral projector between said lateral guideway and said first guideway so disposed with relation to said two guideways that said guideways are optically in planes of conjugate foci of said latter optical means, and means for adjusting each of said guideways independently of one another in at least directions extending longitudinally and laterally of the corresponding film.

4. In an apparatus for producing composite motion pictures, in combination a first guideway adapted to guide a composite image receiving film, a second guideway facing said first guideway and adapted to guide an image carrying film, a projector adapted to project light in a longitudinal direction towards said first guideway through said second guideway, a number of semi-transparent reflecting devices between said first and second guideways each adapted to transmit light travelling towards said first guideway and to reflect towards said first guideway light coming from a transverse direction, in each of said transverse directions a lateral guideway facing said corresponding reflecting device and adapted to guide an image carrying film and a lateral projector adapted to project light towards said reflecting device through said lateral guideway, between each two consecutive reflecting devices an intermediate guideway adapted to guide an image carrying film constituting a mask of the images of the film in the lateral guideway facing the one of said two reflecting devices which is nearer said first guideway, between said second guideway and the reflecting device the most remote from said first guideway a guideway adapted to guide an image carrying film constituting a mask of the images of the film in the lateral guideway facing said latter reflecting device, optical means between each two consecutive guideways disposed along the longitudinal direction, said optical means and guideways being so disposed with relation to each other that said two consecutive guideways are in planes of conjugate foci of said optical means, optical means in the path of light of each lateral projector between the corresponding lateral guideway and the guideway adjacent the corresponding reflecting device in the opposite direction to said second guideway so disposed with relation to said two guideways that said guideways are optically in planes of conjugate foci of said latter optical means, and means for adjusting each of said guideways independently of one another in at least directions extending longitudinally and laterally of the corresponding film.

LEONTI PLANSKOY.